(12) United States Patent
Leonarski

(10) Patent No.: US 12,237,797 B2
(45) Date of Patent: Feb. 25, 2025

(54) INTERFACE CIRCUITS FOR COUPLING HALL SENSORS AND RESOLVERS TO CONTROLLERS IN AC MOTOR SYSTEMS

(71) Applicant: Cummins Inc., Columbus, IN (US)

(72) Inventor: Jaroslaw Leonarski, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 261 days.

(21) Appl. No.: 18/013,216

(22) PCT Filed: Jun. 30, 2021

(86) PCT No.: PCT/US2021/039881
§ 371 (c)(1),
(2) Date: Dec. 27, 2022

(87) PCT Pub. No.: WO2022/026111
PCT Pub. Date: Feb. 3, 2022

(65) Prior Publication Data
US 2023/0253897 A1    Aug. 10, 2023

Related U.S. Application Data

(60) Provisional application No. 63/059,449, filed on Jul. 31, 2020.

(51) Int. Cl.
*H02P 27/04*    (2016.01)
*H02K 11/215*    (2016.01)
(Continued)

(52) U.S. Cl.
CPC .............. *H02P 6/16* (2013.01); *H02K 11/215* (2016.01); *H02K 11/33* (2016.01); *H02K 29/08* (2013.01)

(58) Field of Classification Search
CPC .......... H02P 6/16; H02K 11/215; H02K 11/33; H02K 29/08
See application file for complete search history.

(56) References Cited

U.S. PATENT DOCUMENTS

2004/0124807 A1    7/2004    Nakata et al.
2016/0087561 A1*   3/2016    Rho .................... H02P 6/28
                                                    318/400.04

(Continued)

FOREIGN PATENT DOCUMENTS

| CN | 107645282 B | 10/2020 |
| DE | 102015202303 A1 | 8/2016 |
| DE | 102017214206 A1 | 2/2019 |

OTHER PUBLICATIONS

European Supplementary Search Report and Written Opinion for European patent application No. 21850415, mailed Jul. 16, 2024.

(Continued)

*Primary Examiner* — Muhammad S Islam
(74) *Attorney, Agent, or Firm* — Faegre Drinker Biddle & Reath LLP

(57) ABSTRACT

A resolver excitation output stage amplifier. Disclosed embodiments comprise an amplifier stage and a current protection circuit. The amplifier stage includes one or more amplifier transistors coupled to first and second supply terminals, a timing control terminal and an excitation signal output terminal. The amplifier stage is configured to provide a resolver excitation signal having the excitation frequency at the excitation signal output terminal. The current protection circuit includes one or more protection transistors coupled to the amplifier stage and configured to turn off the one or more transistors of the amplifier stage when current through the one or more transistors of the amplifier stage is greater than a predetermined current value.

15 Claims, 8 Drawing Sheets

(51) Int. Cl.
*H02K 11/33* (2016.01)
*H02K 29/08* (2006.01)
*H02P 6/16* (2016.01)

(56) References Cited

U.S. PATENT DOCUMENTS

| | | |
|---|---|---|
| 2018/0062548 A1 | 3/2018 | Ikenaga |
| 2018/0267092 A1 | 9/2018 | Kurooka et al. |
| 2022/0302858 A1* | 9/2022 | Umamichi ............... G01D 3/08 |

OTHER PUBLICATIONS

European Supplementary Search Report and Written Opinion for European patent application No. 21850415, mailed Jun. 26, 2024.
International Search Report and Written Opinion for International patent application No. PCT/US2021/039881, filed Jun. 30, 2021, mailed Dec. 7, 2021.

* cited by examiner

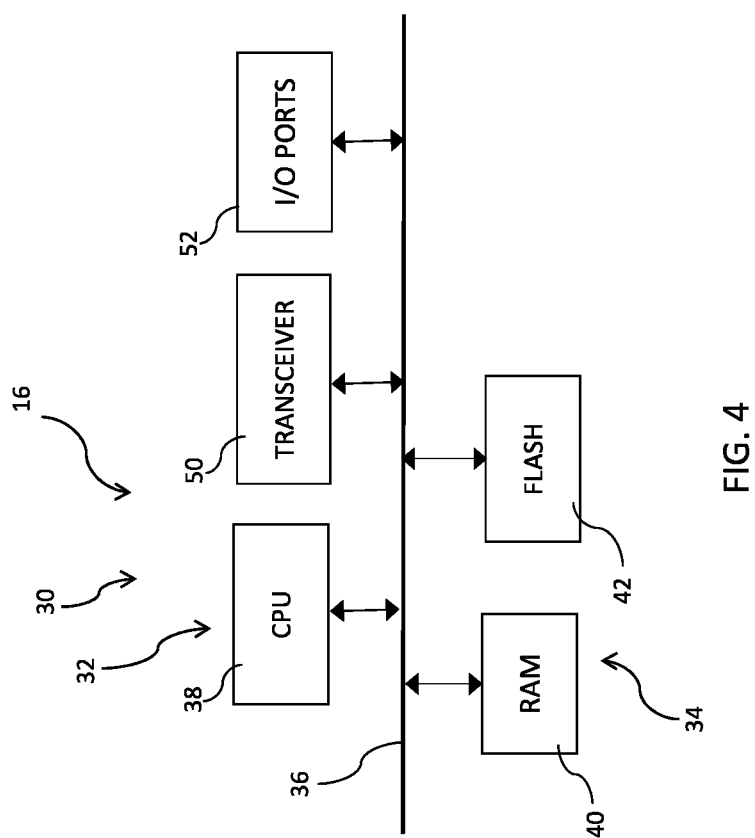

INTERFACE CIRCUITS FOR COUPLING HALL SENSORS AND RESOLVERS TO CONTROLLERS IN AC MOTOR SYSTEMS

CROSS-REFERENCE TO RELATED APPLICATION

The present application claims priority to International Patent Application No. PCT/US2021/039881, filed Jun. 30, 2021 which claims priority to U.S. Provisional Patent Application 63/059,449, filed Jul. 31, 2020, and entitled "INTERFACE CIRCUITS FOR COUPLING HALL SENSORS AND RESOLVERS TO CONTROLLERS IN AC MOTOR SYSTEMS," the complete disclosures of which are expressly incorporated by reference herein.

FIELD

This disclosure relates generally to alternating current (AC) machine systems. In particular, the disclosure relates to interface circuits for coupling machine feedback devices such as resolvers and/or encoder/Hall sensors to controllers in AC machine systems.

BACKGROUND

Multiphase alternating current (AC) machines such as motor and generator systems are used in a wide variety of applications including industrial settings and motor vehicles. Motor systems of these types include an AC motor, inverter and motor control system. In response to an input command, the motor control system causes the inverter to apply power from an energy source to the motor in a controlled manner, and causes the motor to provide the commanded output. For example, in response to a torque command, the motor control system will cause the motor to deliver the requested torque at the motor output shaft.

The control systems make use of feedback from the AC machine. Resolvers and encoder/Hall sensors are examples of devices that are commonly used to generate and provide feedback signals representative of the operation of the AC machine. Resolvers are rotary transformers coupled to the rotating shaft of the AC machine. These devices may be configured to receive an AC excitation signal through a pair of input terminals, and produce four output signals (sometimes referred to as sine+, sine−, cosine+ and cosine−) on four output terminals in response to rotation of the AC machine. Encoder/Hall sensors are positioned to detect rotating magnetic elements on the AC machine and provide pulsed or otherwise varying output signals in response to the machine shaft rotation.

The resolvers and encoder/Hall sensors are typically coupled to the machine control system through a connector and interface circuit. Resolver interface circuits may, for example, include an amplifier to generate the excitation signals in a suitable form (e.g., suitable voltage levels) in response to a timing control signal provided by the machine control system, and a signal conditioning circuit to condition (e.g., amplify) the received resolver output signals. Encoder/Hall sensor interface circuits may for example condition the received output signals by shaping the pulses (e.g., enhancing the pulse shape).

There remains, however, a continuing need for improved interfaces between machine feedback devices such as resolvers and encoder/Hall sensors and the machine control systems to which they are coupled. Interfaces that provide enhanced functionality and that can be efficiently manufactured would be especially desirable.

SUMMARY

Disclosed embodiments include an components of an interface that may be used to couple feedback devices, such as for example resolvers and/or encoder/Hall sensors, to motor control systems in a motor system. One example is a resolver excitation output stage amplifier. Embodiments of the amplifier, comprise first and second supply terminals; a timing control terminal configured to receive a timing signal having an excitation frequency; an excitation signal output terminal; an amplifier stage including one or more amplifier transistors coupled to the first and second supply terminals, the timing control terminal and the excitation signal output terminal, wherein the amplifier stage is configured to provide a resolver excitation signal having the excitation frequency at the excitation signal output terminal; and a current protection circuit including one or more protection transistors coupled to the amplifier stage and configured to turn off the one or more transistors of the amplifier stage when current through the one or more transistors of the amplifier stage is greater than a predetermined current value.

In embodiments, the current protection circuit includes one or more a current sensing circuits to sense the current flowing through the one or more amplifier transistors of the amplifier stage.

In embodiments, the amplifier stage comprises: a first or relatively positive signal portion including a first amplifier transistor coupled to the timing control terminal and between the first supply terminal and the excitation signal output terminal; and a second or relatively negative signal portion including a second amplifier transistor coupled to the timing control terminal and between the excitation signal output terminal and the second supply terminal; and the current protection circuit comprises: a first current sensing circuit including a first protection transistor configured to sense current through the first amplifier transistor, and to turn off the first amplifier transistor when the current through the first amplifier transistor is greater that a first signal portion current value; and a second current sensing circuit including a second protection transistor configured to sense current through the second amplifier transistor, and to turn off the second amplifier transistor when the current through the second amplifier transistor is greater that a second signal portion current value.

Embodiments of the amplifier further comprise a voltage protection circuit coupled between the amplifier stage and the excitation signal output terminal, wherein the voltage protection circuit is configured to decouple the amplifier stage from the excitation signal output terminal when a voltage at the excitation signal output terminal is greater than a predetermined value. The voltage protection circuit may comprise: a first protection transistor coupled between the amplifier stage and the excitation signal output terminal; and a voltage sensing circuit coupled to the excitation signal output terminal and the first protection transistor, wherein the voltage sensing circuit is configured to sense the voltage at the excitation signal output terminal and to turn off the first protection transistor when the voltage at the excitation signal output terminal is greater than the predetermined value.

Another example includes a resolver excitation output stage amplifier, comprising: first and second supply terminals; a timing control terminal configured to receive a timing signal having an excitation frequency; an excitation signal output terminal; an amplifier stage including one or more amplifier transistors coupled to the first and second supply terminals, the timing control terminal and the excitation signal output terminal, wherein the amplifier stage is configured to provide a resolver excitation signal having the excitation frequency at the excitation signal output terminal; and a voltage protection circuit coupled between the amplifier stage and the excitation signal output terminal, wherein the voltage protection circuit is configured to decouple the amplifier stage from the excitation signal output terminal when a voltage at the excitation signal output terminal is greater than a predetermined value.

In embodiments, the voltage protection circuit comprises: a first protection transistor coupled between the amplifier stage and the excitation signal output terminal; and a voltage sensing circuit coupled to the excitation signal output terminal and the first protection transistor, wherein the voltage sensing circuit is configured to sense the voltage at the excitation signal output terminal and to turn off the first protection transistor when the voltage at the excitation signal output terminal is greater than the predetermined value.

Another example further includes a multiple device port for coupling one or more of the resolver or an encoder/Hall sensor to a motor control system in combination with the amplifier. Embodiments of the multiple device port comprise: a first input terminal configured to receive either of a first resolver output signal or an encoder/Hall sensor output signal; a second input terminal configured to receive either of a second resolver output signal or an encoder/Hall sensor output signal; a first encoder/Hall sensor signal conditioning circuit coupled to the first input terminal and configured to provide a first conditioned encoder/Hall sensor output signal when the first input terminal is coupled to receive an encoder/Hall sensor output signal; a second encoder/Hall sensor signal conditioning circuit coupled to the second input terminal and configured to provide a second conditioned encoder/Hall sensor output signal when the second input terminal is coupled to receive an encoder/Hall sensor output signal; and a resolver signal conditioning circuit coupled to the first and second input terminals and configured to provide a conditioned resolver output signal when the first and second terminals are coupled to receive resolver output signals.

In embodiments of the amplifier and multiple device port, one or both of the first and second encoder/Hall sensor conditioning circuits comprise a pulse shaping circuit. In embodiments of the amplifier and multiple device port, the resolver signal conditioning circuit comprises a voltage level compensating circuit.

Examples also include a motor control system interface including two of the resolver excitation output stage amplifiers and two of the multiple device ports.

Examples of the motor control system further include a connector comprising six terminal pins, wherein: a first of the terminal pins is coupled to the excitation signal output terminal of a first of the two resolver excitation output stage amplifiers; a second of the terminal pins is coupled to the excitation signal output terminal of a second of the two resolver excitation output stage amplifiers; a third and a fourth of the terminal pins are coupled to the first and second input terminals of a first of the two multiple device ports; and a fifth and a sixth of the terminal pins are coupled to the first and second input terminals of a second of the two multiple device ports.

Examples include a multiple device port for coupling one or more of a resolver or an encoder/Hall sensor to a motor control system, comprising: a first input terminal configured to receive either of a first resolver output signal or an encoder/Hall sensor output signal; a second input terminal configured to receive either of a second resolver output signal or an encoder/Hall sensor output signal; a first encoder/Hall sensor signal conditioning circuit coupled to the first input terminal and configured to provide a first conditioned encoder/Hall sensor output signal when the first input terminal is coupled to receive an encoder/Hall sensor output signal; a second encoder/Hall sensor signal conditioning circuit coupled to the second input terminal and configured to provide a second conditioned encoder/Hall sensor output signal when the second input terminal is coupled to receive an encoder/Hall sensor output signal; and a resolver signal conditioning circuit coupled to the first and second input terminals and configured to provide a conditioned resolver output signal when the first and second terminals are coupled to receive resolver output signals.

In embodiments of the multiple device port, one or both of the first and second encoder/Hall sensor conditioning circuits comprise a pulse shaping circuit. In embodiments of the multiple device port, the resolver signal conditioning circuit comprises a voltage level compensating circuit.

BRIEF DESCRIPTION OF THE DRAWINGS

FIG. 4 is a diagrammatic illustration of exemplary functional components of the motor control system in accordance with embodiments.

DETAILED DESCRIPTION

Figure 1:
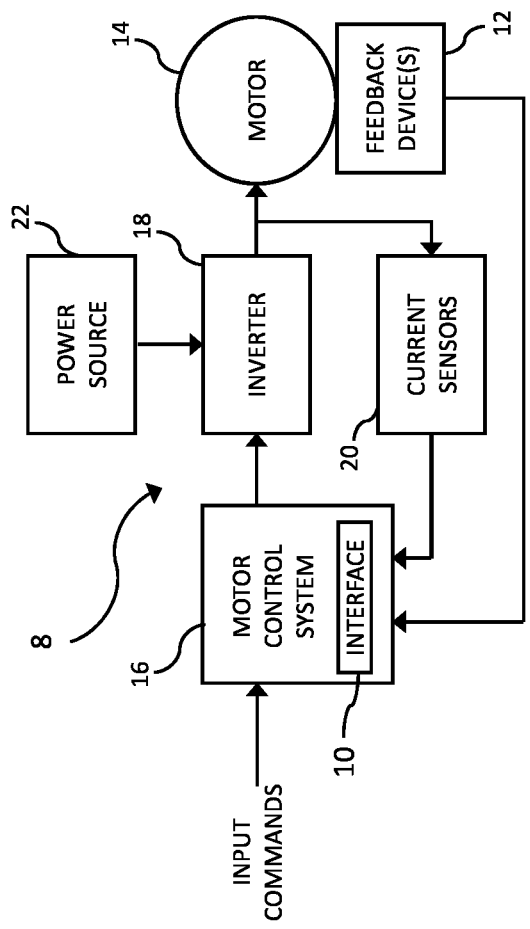
FIG. 1 is a diagrammatic illustration of a motor system including a motor control system-feedback device interface in accordance with embodiments.

FIG. 1 is a diagrammatic illustration of a motor system 8 including an interface 10, one or more feedback devices 12, motor 14 and motor control system 16 in accordance with embodiments. Outputs of the motor control system 16 are coupled to an inverter 18. Inverter 18 is responsive to the outputs of the motor control system 16, and controls the application of power from an energy or power source 22 to the motor 14. Feedback devices 12 provide feedback signals representative of certain operating characteristics of the motor 14 such as the angular positions and rotation of the shaft (not separately shown) of the motor. In addition to control input commands such as a torque request and the feedback signals provided by the feedback devices 12, motor control system 16 is coupled to receive feedback signals representative of electrical operating characteristics or parameters of the motor 14. In the embodiments illustrated in FIG. 1, current sensors 20 provide sensed current parameters to the motor control system 16. In response to input commands and the feedback signal inputs, motor control system 16 provides output drive signals or commands that cause the motor 14 to provide the commanded outputs such as torque levels.

Figure 2:
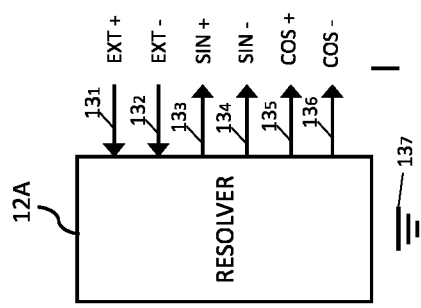
FIG. 2 is a diagrammatic illustration of a resolver that can be used as a feedback device in embodiments of the motor system shown in FIG. 1.

In embodiments, the feedback devices 12 include one or more resolvers 12A such as that illustrated in FIG. 2. The embodiments of resolver 12A illustrated in FIG. 2 includes two input terminals 131 and 132 configured to receive excitation signals (labeled EXT+, EXT−, respectively), and four output terminals 133-136 configured to provide output signals sine+, sine−, cosine+ and cosine− (labeled SIN+, SIN−, COS+, COS−, respectively) generated by the resolver. The input terminals 131,132 and output terminals 133-136 are referenced with respect to a ground terminal 137. Resolvers such as 12A are generally known and commercially available, and can be of any known or otherwise conventional design. Other embodiments of resolvers 12A may have other input and output configurations.

Figure 3:
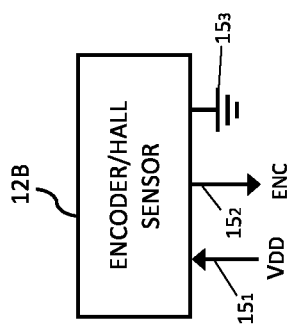
FIG. 3 is a diagrammatic illustration of an encoder/Hall sensor that can be used as a feedback device in embodiments of the motor system shown in FIG. 1.

Alternatively or in addition, embodiments feedback devices 12 include one or more encoder/Hall sensors 12B such as that illustrated in FIG. 3. The embodiments of encoder/Hall sensor 12B illustrated in FIG. 3 includes a supply input terminal 151 configured to receive a power supply potential (labeled $V_{DD}$) and an output terminal 152 configured to provide an encoder output signal (labeled ENC) generated by the encoder/Hall sensor. The supply input terminal 151 and the output terminal 152 are referenced with respect to a ground terminal 153. Encoder/Hall sensors such as 12B are generally known and commercially available, and can be of any known or otherwise conventional design. Other embodiments of encoder/Hall sensors 12B may have other input and output configurations.

In embodiments, motor 14 is a multiphase electric machine having multiple rotor and stator windings. For example, motor 14 may be an interior permanent magnet (IPM) motor, an induction motor, or a synchronous motor. Power source 22 can include a battery, fuel cell, conventional power grid or any other energy source suitable for the motor 14 and its application, and is a direct current (DC) source in embodiments. For example, power source 22 may be a battery for an electric vehicle. Although described in connection with a motor system 8 and motor 14, interface 10 and feedback devices 12 can be incorporated into other multiphase electric machine systems, such as for example a system including a multiphase generator having multiple sets of windings.

Motor 14 operates in response to voltage drive signals or commands applied by the inverter 18. The motor control system 16 provides the voltage drive commands to the inverter 18. Inverter 18 processes the voltage drive commands and applies the commanded voltages to the windings of the motor 14. The voltage drive commands may be pulse-width modulated (PWM) signals. The applied voltages create torque-producing currents in the windings of the motor 14 that result in rotation of the motor shaft (not separately shown). Inverter 18 can be of any known or otherwise conventional design. Such inverters 18 commonly include a plurality of power transistors or other switches to provide the PWM drive signals.

Current sensors 20 are coupled to the motor 14 and provide signals representative of the current on each of the windings of the motor. Current sensors 20 can be any known or otherwise conventional devices. In embodiments, current sensors 20 provide information representative of the magnitude or levels of the currents on the windings of motor 14. With the current level information provided by current sensors 20, motor control system 16 can derive information regarding the relative phases of the currents in the windings of the motor 14.

Feedback devices 12 provide additional or alternative information representative of electrical and/or mechanical operating characteristics or parameters of the motor 14. For example, the output analog signals SIN+, SIN−, COS+ and COS− provided by resolvers such as 12A are representative of actual motor rotor (not shown) position. These resolver output signals are used by the motor control system 16 to control the inverter voltage amplitude and phase versus the motor BEMF (function of the motor speed and its rotor position). This sets the current levels for the motor torque controls. The output digital signals ENC provided by the encoder/Hall sensors such as 12B are representative of the angular position and rotational speed of the rotor of the motor 14. These encoder/Hall sensor output signals are used by the motor control system 16 to control the inverter voltage amplitude and phase versus the motor BEMF (function of the motor speed and its rotor position). This sets the current levels for the motor torque controls.

In embodiments, motor control system 16 is configured to receive a control input command specifying a desired amount of torque to be produced by motor 14. Motor control system 16 processes the torque control input command and feedback signals provided by the feedback devices 12 and current sensors 20 to produce the voltage drive signals that are applied to the inverter 18. Motor control system 16 produces the voltage drive signals based on a control algorithm. In embodiments, motor control system 16 implements flux-weakening (FW) and maximum-torque-per-ampere (MTPA) control algorithms to produce the voltage drive signals as a function of the input command and the feedback signals. FW and MTPA algorithms are generally known, and any such conventional or otherwise known algorithm suitable for the application of the motor system 8 and/or motor 14 can be used.

FIG. 4 is a diagrammatic illustration of exemplary functional components of the motor control system 16 in accordance with embodiments. The illustrated embodiments include a processing system 30 comprising processing components 32 and storage components 34 coupled by a bus 36. Processing components 32 may, for example, include one or more central processing units (CPUs) 38 providing the processing functionality of the motor control system 16. The storage components 34 may include RAM memory 40, ROM or FLASH memory 42 providing the information and other data storage functionality of the motor control system 16. For example, operating system and other software used by the processing components 32 to implement the motor control methods and algorithms may be stored in the storage components 34. Components of the processing system 30 can be implemented as programmed microprocessors, application specific integrated circuits (ASICs, FPGA, CPLD, etc.), controllers and/or discrete circuit components. Other embodiments of the processing system 30 are implemented using other conventional or otherwise known systems or devices. The embodiments illustrated in FIG. 4 also include input/output (I/O) ports 52 (which may include mechanical bus connectors, not shown) through which the motor control system 16 can receive and transmit information or other data. For example, in embodiments, the feedback devices 12 and/or current sensors 20 can be coupled to the processing components 32 through the I/O ports 52.

Interface 10 includes circuitry that couples motor control system 16 to the feedback devices 12. In embodiments of motor system 8 that include one or more resolvers 12A, for example, interface 10 generates the excitation signals EXT+ and EXT− that are coupled to the input terminals 131 and 132 of each resolver, and receives the output signals SIN+, SIN−, COS+ and COS− from the output terminals 133-136 of each resolver. As described below, the interface 10 may also include circuitry to condition the signals SIN+, SIN−, COS+ and COS− received from the resolver 12A. Similarly, interface 10 may couple the supply potential $V_{DD}$ to the supply input terminal 151 of each encoder/Hall sensor 12B, and receive the encoder output signals ENC from the output terminal 152 of each encoder/Hall sensor. As described below, the interface 10 may also include circuitry to condition the encoder output signals ENC received from the encoder/Hall sensor 12B. Although diagrammatically illustrated as a component or subsystem of the motor control system 16 in FIG. 1, interface 10 may be implemented by components physically separate from components of the motor control system in embodiments. In yet other embodiments, the functionality of the interface 10 may be implemented by components distributed both within and outside of the motor control system 16.

Figure 5:
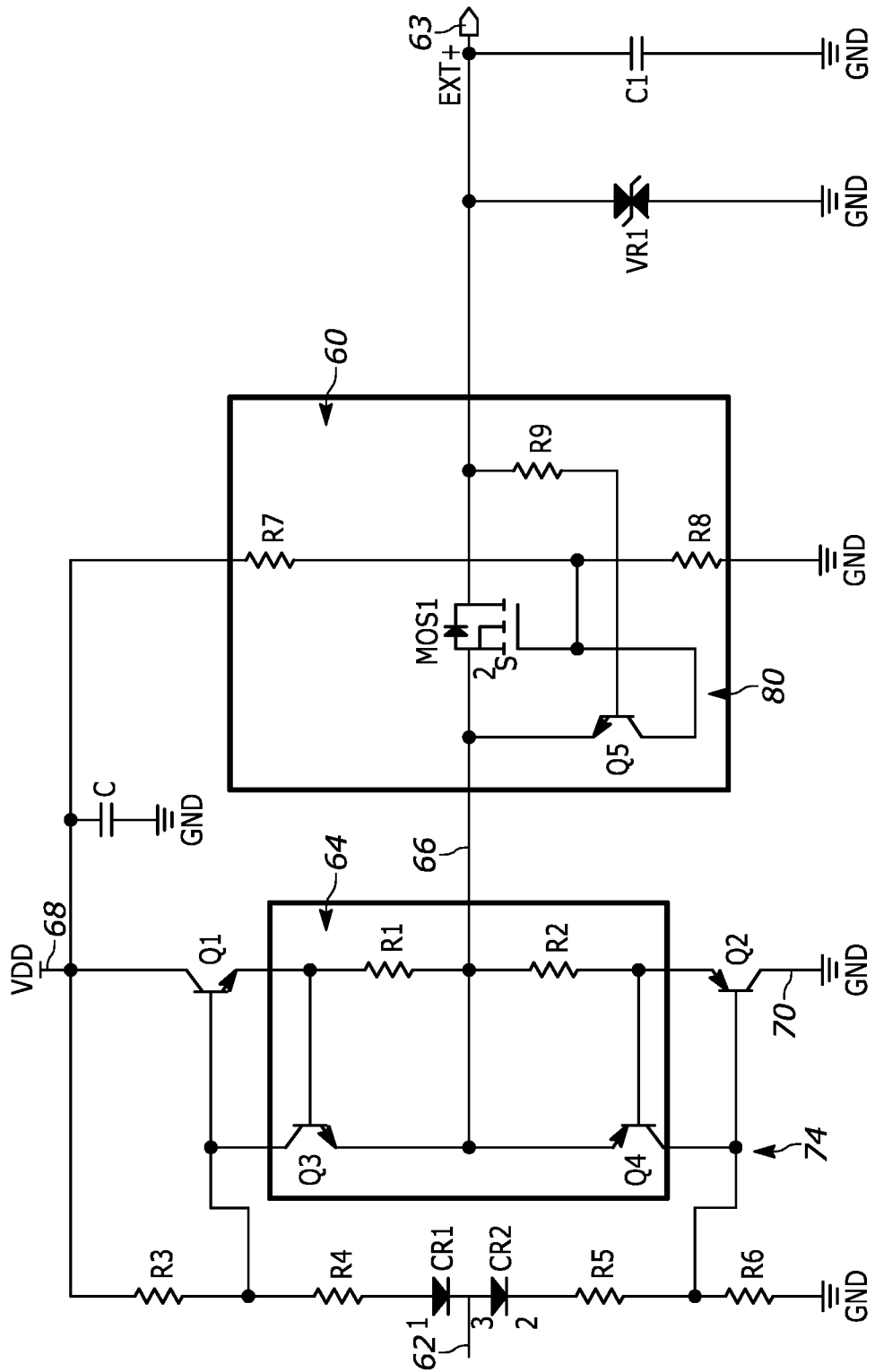
FIG. 5 is a schematic diagram of a resolver excitation output stage amplifier in accordance with embodiments.

FIG. 5 is a schematic diagram of a resolver excitation output stage amplifier 60 in accordance with embodiments. In embodiments, amplifier 60 is a component of the interface 10. In response to a timing control signal received at a timing terminal 62, amplifier 60 produces excitation signals such as EXT+ for the resolver 12A at an excitation output terminal 63. The excitation output signals have the appropriate specifications such as voltage and current levels and frequency for the resolver 12A. The timing control signal received at the terminal 62 has a frequency component corresponding to the desired frequency of the excitation signals, and may be provided by the motor control system 16 or another source. As described below, the amplifier 60 includes circuitry that provides current and/or voltage protection for the primary switching components of the amplifier and other components (e.g., in the motor control system 16) to which the amplifier is connected.

Amplifier 60 includes an amplifier stage 64 that produces a sinusoidal resolver excitation signal EXT+ at terminal 66. The excitation signal EXT+ has the frequency of the timing control signal received at the timing terminal 62. In the illustrated embodiments, the amplifier stage 64 includes an NPN transistor Q1 that couples a first or relatively positive supply potential $V_{DD}$ at a supply terminal 68 to the terminal 66, and a PNP transistor Q2 that couples the terminal 66 to a second or relatively negative supply potential such as ground terminal 70. In the illustrated embodiments, the collector of transistor Q1 is coupled to the supply terminal 68 and the emitter of the transistor Q1 is coupled to the terminal 66. The emitter of transistor Q2 is coupled to the terminal 66, and the collector of the transistor Q2 is coupled to the ground terminal 70. A series connection of resistors R3 and R4 is connected between the supply terminal 68 and the timing terminal 62. A current rectifier diode CR1 couples the resistor R4 to the timing terminal 62. The base of transistor Q1 is connected between the resistors R3 and R4 to receive a bias potential. Similarly, and in a complimentary relationship, a series connection of resistors R5 and R6 is connected between the ground terminal 70 and the timing terminal 62. A current rectifier diode CR2 couples the resistor R5 to the timing terminal 62. The base of transistor Q2 is connected between the resistors R5 and R6 to receive a bias potential.

In response to the timing control signals, transistors Q1 and Q2 operate in a sequential and complimentary switching configuration to produce the excitation signal EXT+ at the terminal 66. Transistor Q1 is a component of a first, upper or relatively positive portion of the amplifier stage 64, and is switched on and off to provide the relatively positive portions of the sinusoidal excitation signal EXT+ at the terminal 66. Similarly, transistor Q2 is a component of a second, lower or relatively negative portion of the amplifier stage 64 and is switched on and off to provide the relatively negative portions of the excitation signal at the terminal 66. In embodiments, for example, the $V_{DD}$ voltage at supply terminal 68 is 15 volts, and the transistor Q1 provides the relatively positive 7.5 V to 15 V sinusoidal portion of the excitation signal EXT+, and the transistor Q2 provides the relatively negative 7.5 V to 0 V sinusoidal portion of the excitation signal EXT+. Other embodiments of amplifier 60 provide excitation signals having other voltage ranges.

Amplifier 60 includes current protection circuit 74 in the illustrated embodiments. Current protection circuit 74 includes transistors Q3 and Q4 and resistors R1 and R2 in the illustrated embodiments. As shown, resistor R1 couples the emitter of transistor Q1 to the terminal 66. The collector-emitter junction of transistor Q3 is coupled between the base of the transistor Q1 and the terminal 66, and the base of transistor Q3 is coupled to the emitter of transistor Q1. Similarly, and in a complimentary relationship, resistor R2 couples the emitter of transistor Q2 to the terminal 66. The collector-emitter junction of transistor Q4 is coupled between the base of the transistor Q2 and the terminal 66, and the base of transistor Q4 is coupled to the emitter of transistor Q2.

Current flowing through the resistors R1 and R2 during the operation of amplifier stage 64 (i.e., when the transistors Q1 or Q2 are switched on) creates voltage drops across the resistors R1 and R2, an the voltage drops across the resistors R1 and R2 are bias voltages applied to the bases of the transistors Q3 and Q4, respectively. In the event or an overcurrent situation were the currents in the amplifier stage 64 reach levels that may damage components such as the transistors Q1 or Q2, transistors Q3 and/or Q4 switch on to couple the bases of the transistors Q1 and/or Q2 to the terminal 66, and thereby effectively switch off and disable the transistors Q1 and/or Q2 to protect the amplifier stage from the potentially damaging currents. Components including transistor Q3 and resistor R1 function as a current sensor that controls the transistor Q1. Similarly, components including transistor Q3 and resistor R2 function as a current sensor that controls the transistor Q2 The components of current protection circuit 74 thereby function as current sensors, and switch off the amplifier stage 64 (e.g., transistors Q1 and/or Q2) when the sensed currents through the transistors exceed predetermined levels or thresholds.

Overcurrent situations of this type may, for example, be caused by improper or other misconnections of the excitation signal output terminal 63, such as for example misconnections that result in an output short. Because the voltage drops across the resistors R1 and R2 cause the transistors Q3 and/or Q4 to switch the transistors Q1 and/or Q2 off to provide the overcurrent protection, parameters of the overcurrent protection circuit 74 such as the values of the resistors R1 and R2 and the maximum current levels to be allowed through the transistors Q1 and Q2 before the overcurrent protection circuit disables operation of the amplifier stage 64 can be selected to provide the desired operation of the current protection circuit and amplifier stage 64. Other embodiments of the interface 10 include other configurations of current protection circuits. Yet other embodiments of amplifier 60 do not include a current protection circuit such as 74.

Amplifier 60 includes a voltage or polarity protection circuit 80 in the illustrated embodiments. Polarity protection circuit 80 includes NPN transistor Q5, P-channel MOSFET transistor MOS1 and resistors R7-R9 in the illustrated embodiments. The source-drain junction of the transistor MOS1 is connected between the terminal 63 and the excitation signal output terminal 66. The series connected resistors R7 and R8 are connected between the supply terminal 68 and the ground terminal 70. The gate of transistor MOS1 and the collector of transistor Q5 are connected to each other and between the resistors R7 and R8. The emitter of transistor Q5 is connected to the terminal 66, and the base of the transistor Q5 is connected to the excitation signal output terminal 63 through the resistor R9.

Transistor MOS1 functions a switch, and during normal operation of the amplifier 60 is biased such that it is switched on to couple the excitation signal EXT+ from the terminal 66 to the excitation signal output terminal 63. In the event of a reverse polarity or other over-voltage situation during which voltage levels at the output terminal 63 may reach levels that may damage components of the interface 10 and/or amplifier stage 64 such as the transistors Q1 and/or Q2, transistor MOS1 switches off to disconnect the output terminal from the amplifier stage. In the illustrated embodiments, the components including transistor Q5 are configured as a voltage sensor to sense the voltage difference between the excitation signal output terminal 63 and the terminal 66, and to switch the transistor MOS1 off when that voltage difference reaches a predetermined level or threshold.

Reverse polarity or other over-voltage situations of these types may occur, for example, by misconnections between other components of the motor system 8 and the excitation signal output terminal 63. Embodiments of motor system 8 may include batteries or other power supplies that supply higher voltage levels than the supply potential $V_{DD}$ of the amplifier 60. For example, in embodiments such as that described above including a 15 volt supply potential $V_{DD}$, the motor system 8 may also include 24 volt batteries. Electric vehicles, for example, may include batteries charged to voltage levels greater than the supply potential $V_{DD}$ of the motor system 8 used in the vehicle. Polarity protection circuit 80 protects other components of the amplifier 60, such as for example amplifier stage 64 and transistors Q1 and/or Q2, against misconnections on the external signal connection such as the output terminal 63. For example, protection can be provided against situations such as swapping polarity, connecting inputs instead of outputs, or even connecting directly other power supplies such as 24 volt batteries to the output terminal 63.

Although the amplifier 60 described in connection with FIG. 5 is configured to produce one of the excitation signals (e.g., EXT+) for the resolver 12A, embodiments of interface 10 include amplifiers similar to amplifier 60 configured to produce additional excitation signals (e.g., EXT−). For example, in embodiments, EXT− is similar or identical to EXT+, but shifted 180° with respect to EXT+.

Figure 6:
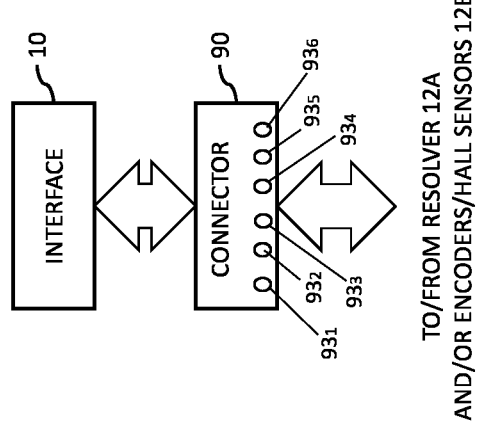
FIG. 6 is a diagrammatic illustration of a connector for connecting feedback devices such as a resolver and/or an encoder/Hall sensor to the interface, in accordance with embodiments.

FIG. 6 is a diagrammatic illustration of a connector 90 for connecting feedback devices 12 such as for example a resolver such as 12A and/or an encoder/Hall sensor such as 12B to the interface 10 in embodiments. The illustrated embodiment of connector 90 has six terminal or connector pins 931-936, each of which is configured to be mechanically and electrically coupled (e.g., by a conventional bus) to one of the terminals 131-136 of a resolver 12A.

Figure 7:
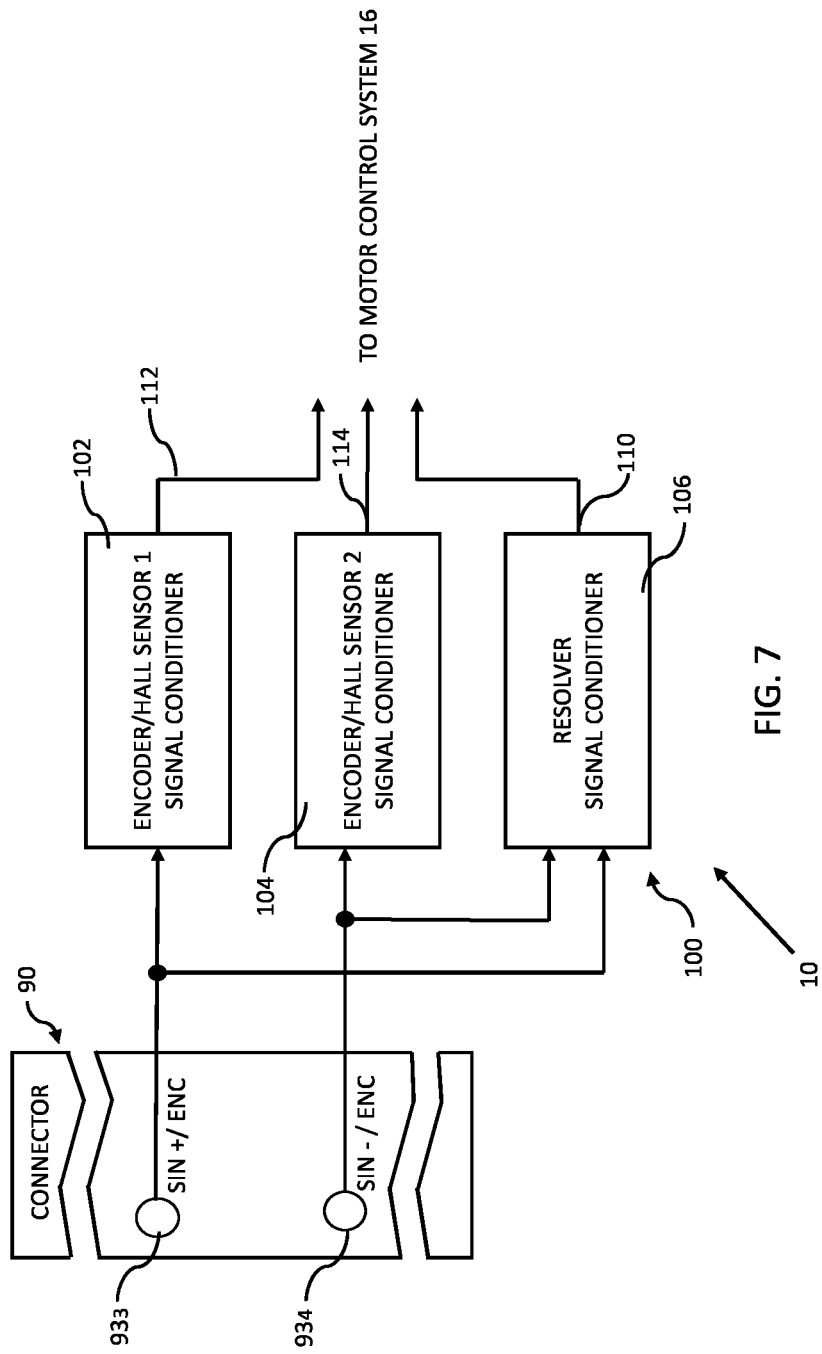
FIG. 7 is a diagrammatic illustration of portions of a universal or multiple feedback device port that can be incorporated into interface, in accordance with embodiments.
Figure 8A:
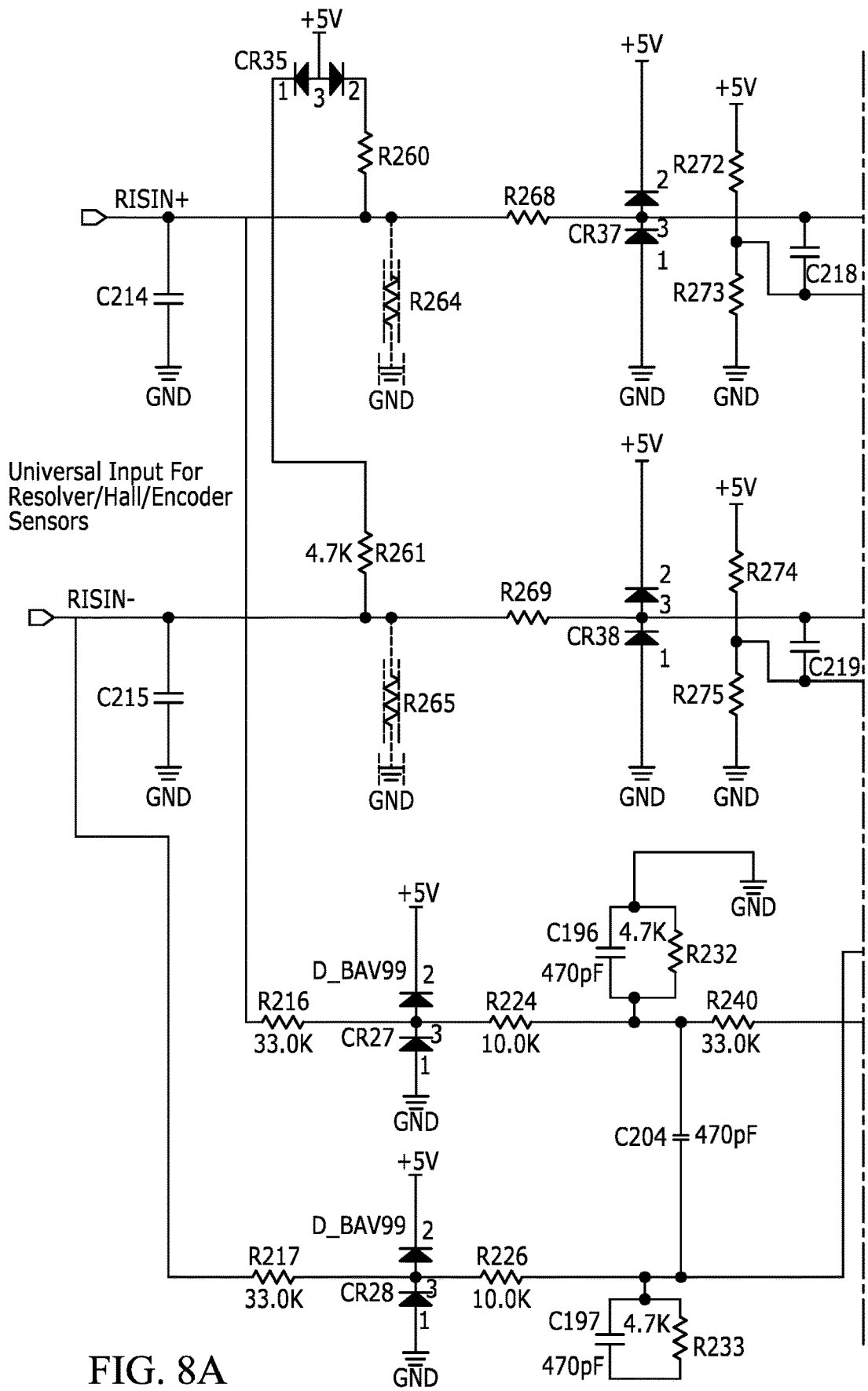
FIG. 8A-8B is a schematic diagram of an embodiment of the portions of the multiple feedback device port shown in FIG. 7.
Figure 8B:
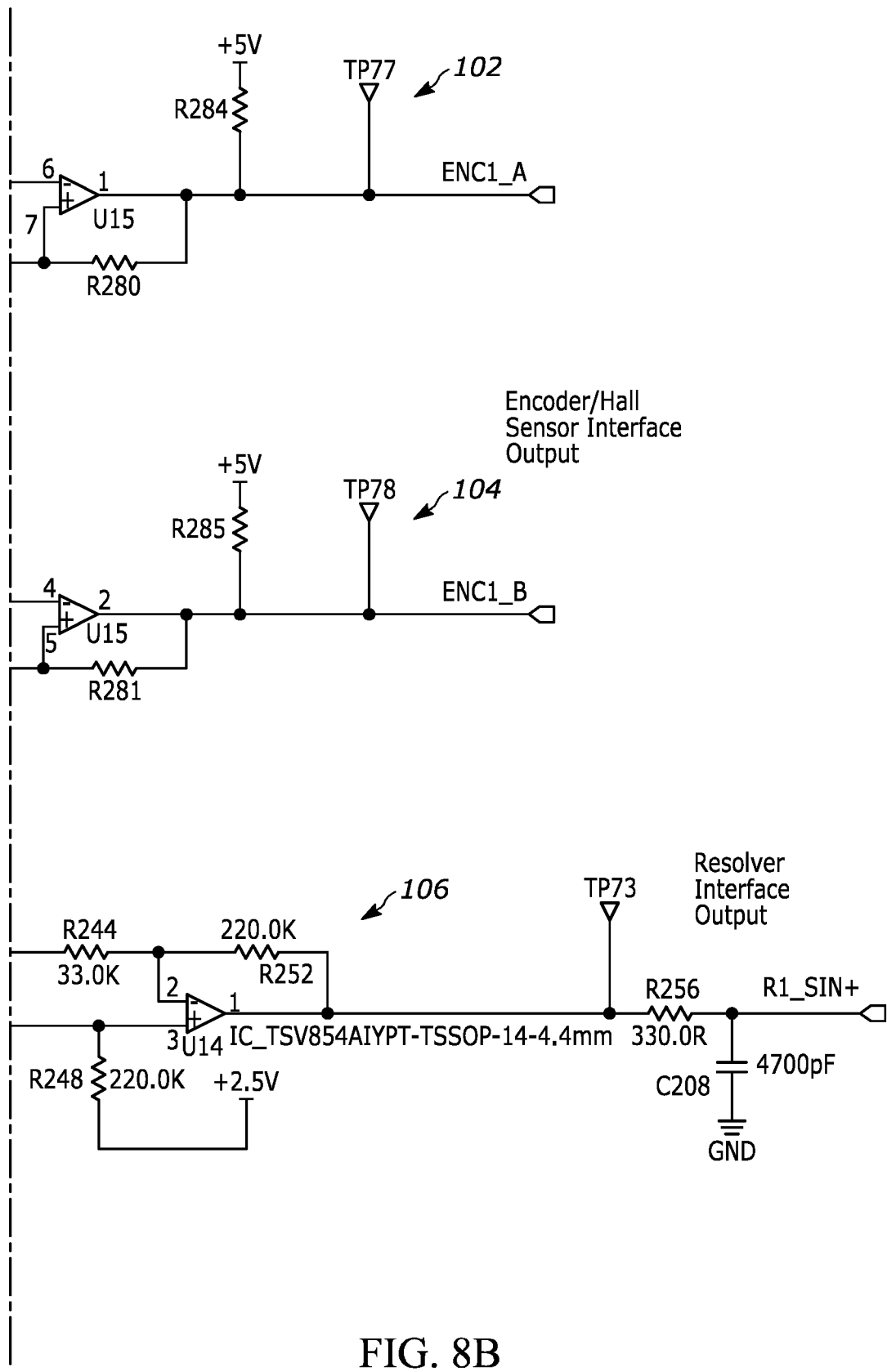

FIG. 7 is a diagrammatic illustration of portions of a multiple feedback device port 100 that can be incorporated into interface 10 to couple the interface to any of several different types of feedback sensors 12 in accordance with embodiments. FIG. 8A-8B is a schematic diagram of circuit elements that implement embodiments of the portions of the multiple feedback device port 100. The illustrated embodiments of port 100 are configured for use with a six-terminal connector 90 such as that also shown in FIG. 6, and can accept as an input any of the output signals SIN+, SIN−, COS+ or COS− of a resolver such as 12A, or the output signals ENC of an encoder/Hall sensor such as 12B.

As shown, the port 100 includes a first encoder/Hall sensor signal conditioner 102, a second encoder/Hall sensor signal conditioner 104, and a resolver signal conditioner 106. Resolver signal conditioner 106, which includes a differential amplifier in embodiments, includes two inputs (e.g., positive and negative) coupled to pins 933 and 934 of the connector 90 in the illustrated embodiments. By this configuration the port 100 can couple the resolver output signals such as SIN+ and/or SIN− to the resolver signal conditioner 106 when the connector 90 is coupled to a resolver such as 12A. Resolver signal conditioner 106, which can be implemented by conventional circuits including operational amplifiers, resistors and capacitors, conditions the received resolver output signals and provides the conditioned output signal (e.g., SIN+) at its output port 110. In embodiments for example, resolver signal conditioner 106 adjusts the voltage levels of the resolver output signals to levels suitable for an analog-to-digital converter (not shown) of the motor control system 16 configured to be coupled to the output port 110 of the resolver signal conditioner 106. Port 100 can thereby be used to connect the motor control system 16 to a motor system 8 including resolvers such as 12A as feedback devices 12, and through a connector such as 90 in the illustrated embodiments (i.e., a resolver-based option).

Port 100 can also be used to connect motor control system 16 to a motor system 8 including encoder/Hall sensors such as 12B as feedback devices (i.e., an encoder/Hall sensor option). This capability can be provided by the use of the same connector 90 used for the resolver-based option described above. By this capability, the port 100 can be used as an interface for motor systems 8 having different types of feedback devices 12 using the same external connector pins.

As shown, the first encoder/Hall sensor signal conditioner 102 has an input connected to pin 933 of the connector 90, and the second encoder/Hall sensor signal conditioner 104 has an input connected to pin 934 of the connector. In embodiments of motor systems 8 including one or more encoder/Hall sensors such as 12B, the output terminal (e.g., 152 in the embodiment described in connection with FIG. 3) of each such encoder/Hall sensor can be connected to either of the pins 933 or 934 of the connector 90, thereby coupling the associated encoder output signal ENC to the input port of the respective encoder/Hall sensor signal conditioner 102, 104. Encoder/Hall sensors signal conditioners 102 and 104, which can be implemented by conventional circuits including operational amplifiers, resistors and capacitors, condition the received encoder output signals and provide the conditioned output signal (e.g., ENC) at the output ports 112 and 114, respectively. In embodiments for example, encoder/Hall sensor signal conditioners 102 and 104 shape (e.g., square-up) the encoder output signals into shapes suitable for digital inputs (not shown) of the motor control system 16 configured to be coupled to the output ports 112, 114 of the encoder/Hall sensor signal conditioners 102, 104.

Resistors R268 and R269 that couple the input terminals of encoder/Hall sensor signal conditioners 102, 104 to the pins 933 and 934 of the connector 90, and the resistors R216 and R217 that couple the input terminals of the resolver signal conditioner 106 to the pins 933 and 934 of the connector 90, respectively, function to prevent overvoltages on the inputs and decouple the use of the resolver or encoder on the same port to protect the internal circuitry from over current damage. Similarly, the pair of diodes CR37 (that couple the input terminal of the encoder/Hall sensor signal conditioner 102 to the $V_{DD}$ (e.g., 5V) and ground supplies), CR38 (that couple the input terminal of the encoder/Hall sensor signal conditioner 104 the $V_{DD}$ and ground supplies), CR 27 (that couple a first of the input terminals of the resolver signal conditioner 106 to the $V_{DD}$ and ground supplies), and CR28 (that couple a second of the input terminals of the resolver signal conditioner 106 to the $V_{DD}$ and ground supplies), respectively, function to prevent overvoltages on the inputs and decouple the use of the resolver or encoder on the same port to protect the internal circuitry from over current damage. The pair of diodes CR35 that couple the input terminals of the encoder/Hall sensor 102 and the encoder/Hall sensor 104 to the $V_{DD}$ supply protect the internal $V_{DD}$ power supply from pushing current from the output port to the internal electronics.

The embodiment of port 100 shown in FIG. 7 is configured with one resolver signal conditioner that receives two resolver output signals for purposes of example. Embodiments of the port 100 may include one or more additional resolver signal conditioners such as 106 coupled to additional pins on the connector 90 to receive, condition and couple to the motor control system 16 additional resolver output signals. For example, the port 100 described in connection with FIG. 7 may have another resolver signal conditioner that is substantially the same as or similar to the resolver signal conditioner 106, with input terminals coupled to pins 935 and 936 of the connector 90 to receive the resolver output signals COS+ and COS− from the resolver 12A.

It is to be understood that the above description is intended to be illustrative, and not restrictive. Many other embodiments will be apparent to those of skill in the art upon reading and understanding the above description. For example, although described in connection with a motor system, other embodiments include other electrical machines, such as generators. It is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

What is claimed is:

1. A resolver excitation output stage amplifier, comprising:
    first and second supply terminals;
    a timing control terminal configured to receive a timing signal having an excitation frequency;
    an excitation signal output terminal;
    an amplifier stage including one or more amplifier transistors coupled to the first and second supply terminals, the timing control terminal and the excitation signal output terminal, wherein the amplifier stage is configured to provide a resolver excitation signal having the excitation frequency at the excitation signal output terminal; and
    a current protection circuit including one or more protection transistors coupled to the amplifier stage and configured to turn off the one or more transistors of the amplifier stage when current through the one or more transistors of the amplifier stage is greater than a predetermined current value.

2. The amplifier of claim 1 wherein the current protection circuit includes one or more a current sensing circuits to sense the current flowing through the one or more amplifier transistors of the amplifier stage.

3. The amplifier of claim 1 wherein:
    the amplifier stage comprises:
        a first or relatively positive signal portion including a first amplifier transistor coupled to the timing control terminal and between the first supply terminal and the excitation signal output terminal; and
        a second or relatively negative signal portion including a second amplifier transistor coupled to the timing control terminal and between the excitation signal output terminal and the second supply terminal; and
    the current protection circuit comprises:
        a first current sensing circuit including a first protection transistor configured to sense current through the first amplifier transistor, and to turn off the first amplifier transistor when the current through the first amplifier transistor is greater that a first signal portion current value; and
        a second current sensing circuit including a second protection transistor configured to sense current through the second amplifier transistor, and to turn off the second amplifier transistor when the current through the second amplifier transistor is greater that a second signal portion current value.

4. The amplifier of claim 1 and further comprising a voltage protection circuit coupled between the amplifier stage and the excitation signal output terminal, wherein the voltage protection circuit is configured to decouple the amplifier stage from the excitation signal output terminal when a voltage at the excitation signal output terminal is greater than a predetermined value.

5. The amplifier of claim 4 wherein the voltage protection circuit comprises:
    a first protection transistor coupled between the amplifier stage and the excitation signal output terminal; and
    a voltage sensing circuit coupled to the excitation signal output terminal and the first protection transistor, wherein the voltage sensing circuit is configured to sense the voltage at the excitation signal output terminal and to turn off the first protection transistor when the voltage at the excitation signal output terminal is greater than the predetermined value.

6. A resolver excitation output stage amplifier, comprising:
    first and second supply terminals;
    a timing control terminal configured to receive a timing signal having an excitation frequency;
    an excitation signal output terminal;
    an amplifier stage including one or more amplifier transistors coupled to the first and second supply terminals, the timing control terminal and the excitation signal output terminal, wherein the amplifier stage is configured to provide a resolver excitation signal having the excitation frequency at the excitation signal output terminal; and
    a voltage protection circuit coupled between the amplifier stage and the excitation signal output terminal, wherein the voltage protection circuit is configured to decouple the amplifier stage from the excitation signal output terminal when a voltage at the excitation signal output terminal is greater than a predetermined value.

7. The amplifier of claim 6 wherein the voltage protection circuit comprises:
  a first protection transistor coupled between the amplifier stage and the excitation signal output terminal; and
  a voltage sensing circuit coupled to the excitation signal output terminal and the first protection transistor, wherein the voltage sensing circuit is configured to sense the voltage at the excitation signal output terminal and to turn off the first protection transistor when the voltage at the excitation signal output terminal is greater than the predetermined value.

8. The amplifier of claim 1 and further including a multiple device port for coupling one or more of the resolver or an encoder/Hall sensor to a motor control system, comprising:
  a first input terminal configured to receive either of a first resolver output signal or an encoder/Hall sensor output signal;
  a second input terminal configured to receive either of a second resolver output signal or an encoder/Hall sensor output signal;
  a first encoder/Hall sensor signal conditioning circuit coupled to the first input terminal and configured to provide a first conditioned encoder/Hall sensor output signal when the first input terminal is coupled to receive an encoder/Hall sensor output signal;
  a second encoder/Hall sensor signal conditioning circuit coupled to the second input terminal and configured to provide a second conditioned encoder/Hall sensor output signal when the second input terminal is coupled to receive an encoder/Hall sensor output signal; and
  a resolver signal conditioning circuit coupled to the first and second input terminals and configured to provide a conditioned resolver output signal when the first and second terminals are coupled to receive resolver output signals.

9. The amplifier and multiple device port of claim 8 wherein one or both of the first and second encoder/Hall sensor conditioning circuits comprise a pulse shaping circuit.

10. The amplifier and multiple device port of claim 8 wherein the resolver signal conditioning circuit comprises a voltage level compensating circuit.

11. A motor control system interface including two of the resolver excitation output stage amplifiers of claim 1 and two of the multiple device ports of claim 8.

12. The motor control system interface of claim 11 and further including a connector comprising six terminal pins, wherein:
  a first of the terminal pins is coupled to the excitation signal output terminal of a first of the two resolver excitation output stage amplifiers;
  a second of the terminal pins is coupled to the excitation signal output terminal of a second of the two resolver excitation output stage amplifiers;
  a third and a fourth of the terminal pins are coupled to the first and second input terminals of a first of the two multiple device ports; and
  a fifth and a sixth of the terminal pins are coupled to the first and second input terminals of a second of the two multiple device ports.

13. A multiple device port for coupling one or more of a resolver or an encoder/Hall sensor to a motor control system, comprising:
  a first input terminal configured to receive either of a first resolver output signal or an encoder/Hall sensor output signal;
  a second input terminal configured to receive either of a second resolver output signal or an encoder/Hall sensor output signal;
  a first encoder/Hall sensor signal conditioning circuit coupled to the first input terminal and configured to provide a first conditioned encoder/Hall sensor output signal when the first input terminal is coupled to receive an encoder/Hall sensor output signal;
  a second encoder/Hall sensor signal conditioning circuit coupled to the second input terminal and configured to provide a second conditioned encoder/Hall sensor output signal when the second input terminal is coupled to receive an encoder/Hall sensor output signal; and
  a resolver signal conditioning circuit coupled to the first and second input terminals and configured to provide a conditioned resolver output signal when the first and second terminals are coupled to receive resolver output signals.

14. The multiple device port of claim 13 wherein one or both of the first and second encoder/Hall sensor conditioning circuits comprise a pulse shaping circuit.

15. The multiple device port of claim 13 wherein the resolver signal conditioning circuit comprises a voltage level compensating circuit.

\* \* \* \* \*